United States Patent [19]
Schierloh et al.

[11] 3,765,869
[45] Oct. 16, 1973

[54] METHOD OF PRODUCING IRON-ORE PELLETS

[75] Inventors: Uwe Schierloh; Peter Heinrich, both of Oberhausen, Germany

[73] Assignee: Huttenwerk Oberhausen Aktiengesellschaft, Oberhausen, Germany

[22] Filed: Nov. 16, 1970

[21] Appl. No.: 89,805

[30] Foreign Application Priority Data
Nov. 24, 1969 Germany.................. P 19 58 845.5

[52] U.S. Cl............................................. 75/3, 75/5
[51] Int. Cl............................................... C21b 1/08
[58] Field of Search....................... 75/1, 3, 4, 5, 25

[56] References Cited
UNITED STATES PATENTS

| 3,644,113 | 2/1972 | Lang | 75/3 |
|---|---|---|---|
| 3,653,874 | 4/1972 | Schulte | 75/3 |
| 3,652,260 | 3/1972 | Azami | 75/3 |
| 3,567,811 | 3/1971 | Humphrey | 75/25 |
| 3,351,459 | 11/1967 | Mills | 75/4 |
| 3,180,723 | 4/1965 | McCauley | 75/3 |
| 2,918,364 | 12/1959 | Lesher | 75/4 |
| 3,125,437 | 3/1964 | Moore | 75/3 |
| 3,153,586 | 10/1964 | Wienert | 75/3 |
| 3,567,428 | 3/1971 | Svensson | 75/3 |
| 3,490,895 | 1/1970 | Svensson | 75/3 |

*Primary Examiner*—L. Dewayne Rutledge
*Assistant Examiner*—Peter D. Rosenberg
*Attorney*—Karl F. Ross

[57] ABSTRACT

Green (nonfired) pellets of iron ore are prepared by pelletizing the iron ore and 2 to 8 percent by weight of finely divided metallic iron with a particle size below 45 microns in the presence of an aqueous solution, suspension or dispersion of an organic binder, preferably a carbonhydrate. Surprisingly, the low-temperature binder, i.e. the starch, dextrine or the like, in combination with the metallic iron powder, affords considerable structural integrity to the pellets during the initial and subsequent stages of the direct reduction in a shaft-type or rotary furnace.

3 Claims, 1 Drawing Figure

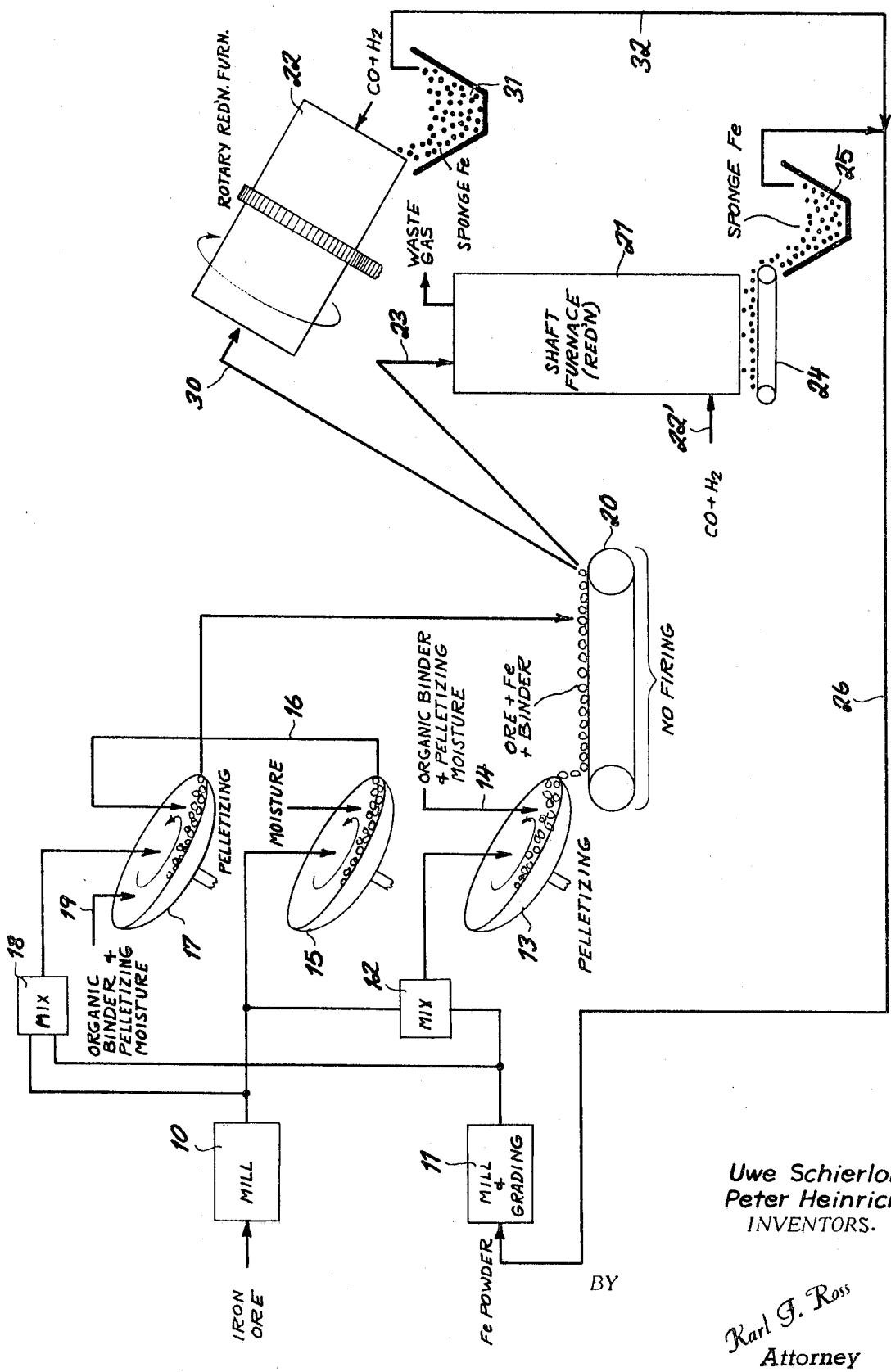

METHOD OF PRODUCING IRON-ORE PELLETS

FIELD OF THE INVENTION

The present invention relates to pellets for use in the direct reduction of iron ore, i.e., the solid/gas reaction of iron ore with a reducing gas to produce metallic iron (generally sponge iron). More particularly, the invention relates to a method of making pellets for the direct conversion of iron ore into sponge iron, to the pellets made by this method, and to related improvements in the art of pelletizing iron ore.

BACKGROUND OF THE INVENTION

Increasingly, the metallurgy of iron and especially processes for the conversion of iron ore to metallic iron, have concentrated upon "direct reduction," i.e. the reaction of solid iron ore with a gaseous reduction medium to produce metallic iron. For the most part, the gas reduction of iron ore to metallic iron takes place without melting the iron produced in the reaction and yields a product which has a higher specific surface area and considerable porosity. The product, generally known as sponge iron, has a high degree of purity and can be smelted in electric furnaces and by various other techniques and refined to steel; the iron also may be comminuted for use in powder-metallurgy processes with compaction, sintering or the like.

Direct or gas phase reduction of iron generally makes use of reducing gases, such as mixtures of carbon monoxides and hydrogen, and can be carried out in shaft or cupola furnaces, rotary furnaces or kilns, or cyclone furnaces. The latter system relies upon the fact that the particles of iron ore can be entrained in a gas stream and includes the reaction of finely divided iron ore and reducing gas in a chamber in which the iron ore is not bedded. In a rotary kiln furnace and in shaft-type furnaces, the iron ore is used in an agglomerated state, e.g., in the form of pellets. When such pellets are employed, they may either form a moving mass, as in a rotary kiln, or may pass downwardly in a stack or bed, countercurrent to the reducing gas as in a shaft furnace.

Many of the parameters of the reducing interaction of the iron ore and the gas depend upon the physical properties and characteristics of the pellets. For example, when the pellets have low abrasion resistance and compressive strength, they cannot be handled without deterioration and, in use, tend to break up into small particles which, in a shaft-type furnace, block the interstices of the bed through which the gas must pass. The reaction is nonuniform throughout the cross-section of the furnace, there is poor heat economy and the process requires large amounts of energy per ton of product for displacement of the gas. The pellets must also have relatively high "low-temperature strength" to reduce crumbling and deterioration at the commencement of the reducing process and should be produced so as to be substantially free from impurities at the end of the process.

In the technology of pellet metallurgy, one may make use of so-called "green" pellets or fired or burned pellets. Green pellets are the product of pelletization in the presence of moisture, for example, with or without binders and having relatively low compressive strength in the absence of firing. Prior to firing or when no firing is employed before the pellets are subjected to heat in the reducing furnace, the pellets are described as "green." However, once the pellets are fired or burned to bring about a sintering of the parts together, they can be described as "burned pellets." Burned pellets have a higher compressive strength but obviously involve greater costs.

The major concern of the present invention is with green pellets, i.e., unburned pellets, and it should be understood that the subsequent discussion is directed to this limited field of pellet technology.

As already noted, green pellets are produced from iron ore by mixing the comminuted iron ore with a binder and pelletizing the resulting mixture. The strength of such green pellets during the reducing process has not been satisfactory heretofore and hence burned pellets have been substituted. It should be noted that another reason for rejecting green pellets in many cases was the undesired effect of the binder on the reducing process, the binder often introducing alien materials requiring removal at a subsequent time.

In one prior-art system, the binder for the iron ore of green pellets in the production of sponge iron in direct-reduction installations, was a silicate or clay-containing substance which was also a slag former. However, such binders were found to be effective only upon firing of the pellets and hence can be described as high-temperature binders. These pellets had numerous disadvantages. Firstly, there was the expense of the high-temperature binder and the firing process. Secondly, there is a requirement during the smelting step of additional slagging materials such as lime to eliminate the binder. This additional lime and the need to fuse the slag is accompanied by additional heat requirements. Even where the iron is to be converted into steel, the pellets produced by these techniques were disadvantageous for the economic reasons set forth above. However, where iron powder was to be recovered, e.g., for powder-metallurgical purposes, the product was found to be contaminated with the binder to the point that considerable effort was necessary to eliminate the high-temperature particles from the iron particles. Failure to exclude the binder particles resulted in high wear of the forming dies in which the iron powder was compressed, deriving from the abrasive nature of the binder.

In the literature, numerous other techniques have been proposed to increase the compressive strength of burned pellets without simultaneously raising the quantity of slag-forming high-temperature binders which are employed. These techniques involve pretreatment of the iron ore or use of additives which raises the cost of the pellets considerably. Techniques have also been developed for increasing the green strength of the particles with unreduced or partly prereduced components of the pellets. These techniques have concentrated upon forced adjustment of the moisture content, the storage of the particles to modify moisture content or to age the particles, etc. Even the introduction of iron sponge as a component of the pellets has been proposed. However, no significant effect has been found on the compressive strength in any arrangement in which the treatment was reasonably economical. It has already been noted that organic binders have been proposed for the pellets and much may be made of starch and like materials which have low decomposition temperatures and hence are effective as binders only at low temperatures (low-temperature binders). Such binders have been found to increase the green strength of the particles but to be ineffective during subsequent parts of the reduction process and hence are not fully satisfactory and have not gained wide-spread acceptance.

OBJECTS OF THE INVENTION

It is the principal object of the present invention to provide a method of making iron-ore pellets, especially for the direct reduction of iron ore to metallic iron, with improved physical properties and strength characteristics.

It is another object of the invention to provide an improved method of making such pellets.

A further object of the invention resides in a method of making improved green iron-ore pellets for direct reduction processes which is of low cost and yields a product having high green strength and little tendency to deteriorate during later stages of the reducing process.

Yet another object of the invention is to provide a method of making iron-ore pellets for the purposes described wherein the pellets can be handled and introduced into the furnace with a minimum of deterioration, which will yield a product substantially free from contaminants deriving from the pelletizing process, and which will provide pellets with satisfactory physical characteristics during all stages of the reducing process.

SUMMARY OF THE INVENTION

These objects and others which will become apparent hereinafter, are attained, in accordance with the present invention, with a process for or method of producing green pellets, (i.e., unburned or nonfired pellets) of iron ore for use in the direct reduction of iron ore to metallic iron (sponge iron), whereby the pellets have increased strength and structural integrity both upon formation and during the reducing process, the method being based upon the surpring discovery that a combination of finely divided metallic iron and certain low-temperature organic binders, when used with finely divided iron ore, gives rise to pellets of a strength characteristic and integrity far superior to any which might have been predicted from the use of either the metallic iron or the organic binder alone. This invention thus resides in the production of iron-ore pellets with a binder and the addition of finely divided iron powder and the subsequent pelletization of the mixture using conventional techniques, the pelletization moisture being introduced as the vehicle for the binder.

An important feature of the invention resides in the fact that, prior to introducing the pellets into the reducing installation, burning or firing the pellets is excluded; furthermore, no high-temperature binders whatever are added to the mixture prior to pelletization. The binder system consists of the iron powder and the low-temperature binding means, in combination, the result being a pellet whose strength characteristics far exceed any which might be expected from the individual use of iron and the low-temperature binder and even that which might have been predicted from the additive use of iron and such binders, had the same been known to the art. The low-temperature binder according to the present invention is one which consists of an organic substance in solution, suspension or dispersion in water and which has a decomposition temperature such that it is wholly converted to gases, e.g., hydrocarbons, carbon monoxide, carbon dioxide, hydrogen and water vapor at the reducing temperatures during the initial stages of the direct reduction process. Best results have been obtained with carbohydrates and especially starch and certain sugars such as dextrine.

The combination of binders according to the present invention (finely divided iron powder and organic low-temperature binder) has the surprising advantage that the green pellets immediately upon formation have a satisfactory compressive strength and wear resistance and can be fed to the direct reduction installation without further manipulation. In the reducing furnace, moreover, the pellets have astonishingly increased strength which cannot be fully explained at the present state of knowledge of the response of the pellets to the reduction temperature and gases. It appears that at low temperatures, the binder is effective as an adhesive and, as the decomposition temperature is increased, the particle-bridging crystals of the binder decompose to produce carbon and the decomposition products mentioned earlier. The carbon appears to remain for a time as a binder and then is transformed by reaction into carbon monoxide. This reaction and a chemical interaction between the iron particles and the iron oxides, further appear to form mechanical bridges which increase the strength of the pellets. As a result, substantially until complete reduction is effected, the pellets have an astonishingly high compressive strength and wear resistance.

We have discovered that best results are obtained when the metallic iron is comminuted sponge iron and is employed with a particle size below 45 microns and preferably between 1 micron and 45 microns (exceptional results being obtained with iron particles with a particle size of 5 to 35 microns). However, the finer the iron powder, the smaller is the amount of the iron powder which may be used within the limits set forth below. The iron powder must be present in an amount no less than 2 percent by weight of the pellet and may be used in an amount up to 8 percent by weight, higher proportions being uneconomical and unnecessary. However, it is preferred to use 3 to 6 percent by weight of the iron powder.

Since the iron powder may be derived from the direct-reduction installation in which the pellets are used, after grinding or milling of the sponge iron product, a feedback of the iron powder may be provided to minimize the cost.

According to another specific feature of the invention, the low-temperature binder which is included together with the finely divided metallic iron as the binder system for the pellets, consists of at least one carbohydrate, especially a starch, e.g., $C_6H_{10}O_5$, or dextrine. The carbohydrate is employed in an amount of 0.2 to 0.5 percent by weight of the iron ore.

It has been surprisingly found that the pellets of the composition set forth above can be used equally satisfactorily in shaft furnaces and a rotary furnace and, during the reduction process, develop a mechanic strength in many cases superior to the highest-quality burned pellets. In the green strength, the pellets according to the present invention resemble prior green pellets. Of course, it is possible to increase the green strength further by including the liquid used for pelletizing a substance which increases its surface tension. Sugar (sucrose) has been found to be a suitable additive for this purpose.

It is important to mention that whereas most green pellets held together with a binder lose their compressive strength when heated to temperatures at which the binder is destroyed or lost from the pellet, the pellets, according to the invention, suffer no such loss and even develop greater strength presumably because of the aforementioned chemical reaction of the iron oxides of the ore, the iron powder and, possibly, the carbon produced by the pyrolytic decomposition of the binder. A network of crystal bridges develop in the pellet which augments the strength thereof. During the further course of the reduction process, reduction is carried out together with the formation of new crystal bonds between the particles and, finally, at the conclusion of the process, both the bonds and the particles are found to consist of iron and the pellets are transformed into sponge-iron pellets. It is important for the present invention that high-temperature binders of the type set forth above, consisting mainly of slag-forming materials, not be used. The product contains no residue from the organic binder and the iron-forming part of the binder component is indistinguishable from the binder produced during the current reduction step.

In the pelletization process, the finely divided iron powder can be first mixed with the iron ore and the mixture pelletized with the addition of the organic binder in the aqueous vehicle, or the iron ore can be initially subjected to agglomeration to form said particles upon which a mixture of the iron ore and metallic iron are pelletized. In the latter case, the organic binder need only be supplied in the last stage. In the first case, the iron powder is distributed uniformly throughout the pellet while, in the latter case, the iron powder is located more or less exclusively in the shell surrounding the core or seed. Both particles are essentially equivalent in the mechanical properties.

DESCRIPTION OF THE DRAWING

The above and other objects, features and advantages of the present invention will become more readily apparent from the following description, reference being made to the accompanying drawing in which the sole FIGURE is a flow diagram illustrating various aspects of the present invention.

SPECIFIC DESCRIPTION

In the drawing, iron ore is milled (ground) at 10 to a particle size of approximately 0.01 to 0.5 mm, preferably more than 90 percent by weight being less than 0.1 mm, while Fe powder is ground to a particle size of less than 45 microns at 11, the particles being mixed in the indicated proportion at 12 and subjected to pelletization on a rotary pelletizing disk 13 to which the organic binder and pelletizing moisture are supplied at 14. Alternately, the milled iron ore is delivered to a prepelletization stage 15 where the iron ore (without the fine iron particles) is pelletized with moisture (without organic binder) to yield said particles which are delivered at 16 to the main pelletizing dish 17. The pellets are formed at 17 by coating the seed particles with a mixture of the iron ore and the finely divided iron obtained at 18, the pelletization being carried out in the presence of an organic binder dissolved, suspended or dispersed in the pelletizing moisture as delivered at 19.

The pellets from either pelletizing system are delivered directly, e.g., via a conveyer 20 without firing, to a reducing installation in the form of a shaft furnace 21 or a rotary reduction furnace 22. In the shaft furnace, reducing gas, e.g., a mixture of carbon monoxide and hydrogen is led into the furnace at its base 22' and passes upwardly, countercurrent to the descending charge of iron-ore pellets as introduced at 23. At the base of the furnace, a discharge device 24 may be employed to dump the sponge iron 25. A portion of the sponge iron can be recycled as represented by line 26, to the mill 11.

Similarly, the iron-ore pellets are delivered at 30 to the rotary reduction furnace 22 and sponge iron emerges at 31, part of which may be employed as the metallic-iron portion of the binder, as represented at 32.

EXAMPLES

The following Examples are illustrative of the present invention. It should be noted that an important result of the present invention is the automatic increase in the compressive strength of the pellets during reduction, as represented by the resistance of the charge within the furnace to the throughflow of gases. When pellets crumble within the charge of a shaft-type furnace, the particles resulting from the deterioration pack the interstices between the unaffected pellets and increase the resistance to throughflow (high pressure drop). Conversely, when the pellets remain intact because of their high compressive strength, there is little if any reduction in the free cross-section of the charge and the resistance to throughflow rises only slightly (low-pressure loss). In both cases, increasing temperatures result in a decrease in the free cross-section which are generally considered by suitable calculation or disregarded, in the event the charges are not at the same temperature.

In all of the tests detailed hereunder, the iron ore was hematite of the following sieve analysis:

| <0.045 | <0.063 | <0.090 | <0.125 | <0.16 mm diameter |
|---|---|---|---|---|
| 44.84 | 73.34 | 95.45 | 99.05 | 99.46 weight percent |
| <0.25 | <0.315 mm diameter | | | |
| 99.67 | 100.00 weight percent | | | |

One portion of the pellets (test A) was prepared by pelletization with 0.35 percent by weight dextrine (with respect to the iron ore) dissolved in the pelletizing moisture, the pelletizing moisture being the same in all of the cases. In test B, 0.49 percent by weight (of the iron ore) of dextrine was used as the binder together with 3 percent by weight of the pellet of iron powder, at least 96 percent by weight of which had a particle size below 45 microns. In test C, the same proportions and characteristics as in text B were applied except that the amount of iron powder was raised to 4 percent by weight. In test D, the pieces were of similar particle sizes of the same ore, omitting both the organic binder and the iron. Tests were made with equal piled heights of charge in a direct-reduction furnace and the pressure drop in terms of 100 percent for test D was determined. In case A, a complete collapse of the pellets was observed and the pressure drop too high to be measurable. In test B, 85.4 percent of the pressure drop was observed, in test C, the pressure drop was 81.3 percent and in test D, of course, the pressure drop was 100 percent, the latter being used as the base.

These results demonstrate that the production of green pellets with low temperature binders alone yield products with no strength at higher temperatures, and only upon the admixture of iron powder and the low-temperature binder, do the pellets survive the rigors of the reduction process.

In test C', 4 percent by weight of iron powder containing 96 percent by weight of particles below 45 microns was used in the pellet with 0.3 percent by weight dextrine as the low-temperature binder. In test E, a larger-size iron powder was employed in the same proportion, 80 percent by weight having a particle size between 45 and 90 microns while only 20 percent by weight had a particle size below 20 microns. The pressure drop in a test similar to that given above, in terms of test D, showed the pellets of sample C' with 81.3 percent and the sample of test E with 275 percent. From this it is apparent that not only the amount of iron in the combination, but also the particle size is critical. When starch was substituted for dextrine, similar results were obtained.

The improvement described and illustrated is believed to admit of many modifications within the ability of persons skilled in the art, all such modifications being considered within the spirit and scope of the invention except as limited by the appended claims.

We claim:

1. In a method of producing iron wherein green pellets of an iron-oxide ore are directly reduced with a reducing gas without prior firing of the pellets, the improvement which comprises the step of increasing the compressive strength of the pellets during reduction by incorporating in the pellets during the formation thereof an organic low-temperature carbohydrate binder selected from the group which consists of dextrine and starch, in an aqueous medium and in an amount between 0.2 and 0.5 percent by weight of said ore and finely divided sponge iron having a particle size less than 45 microns in an amount of 2 to 8 percent by weight.

2. The improvement defined in claim 1 wherein said iron is present in an amount between 3 and 6 percent by weight of the pellet.

3. The improvement defined in claim 2 wherein said sponge iron is obtained by milling a portion of iron directly reduced from such pellets.

* * * * *